July 10, 1962 W. H. SHERIFF 3,043,268
ANIMAL RESTRAINING DEVICE
Filed April 6, 1960 2 Sheets-Sheet 1
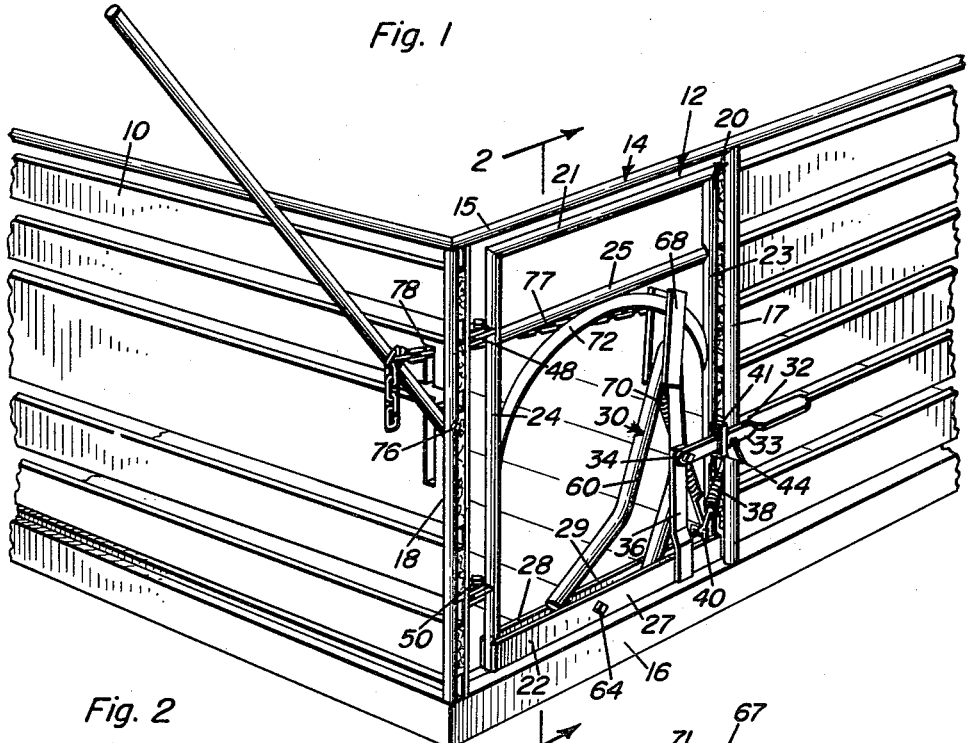
William H. Sheriff
INVENTOR.
BY Clarence A. O'Brien
and Harvey B. Jackson
Attorneys July 10, 1962     W. H. SHERIFF     3,043,268
ANIMAL RESTRAINING DEVICE Filed April 6, 1960     2 Sheets-Sheet 2

William H. Sheriff
INVENTOR.

United States Patent Office 3,043,268
Patented July 10, 1962

3,043,268
ANIMAL RESTRAINING DEVICE
William H. Sheriff, R.F.D., Goodell, Iowa
Filed Apr. 6, 1960, Ser. No. 20,427
7 Claims. (Cl. 119—98)

This invention relates to an animal restraining device and more particularly to a simple device for holding large and/or small animals temporarily while one or more procedures are accomplished on the animal.

Briefly, the invention is embodied in a gate which has a restraining device of a novel construction operatively connected with it. The restraining device is characterized by its use and by its effectiveness.

The restraining feature of the invention enables large hogs and brood sows to be held while the same are being castrated, rung or samples of blood taken for blood testing. A simple movement of a lever is all that is required for exerting the necessary clamping action behind the hog jowls to push the hog against an outer post and hold the hog securely, without effort and without damage to the hogs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing one typical use of the animal holder or restraining device.

FIGURE 2 is a sectional view taken on the line 2—2 of FIGURE 1.

FIGURE 5 is a perspective view of the movable section of the clamp.

Figure 3:
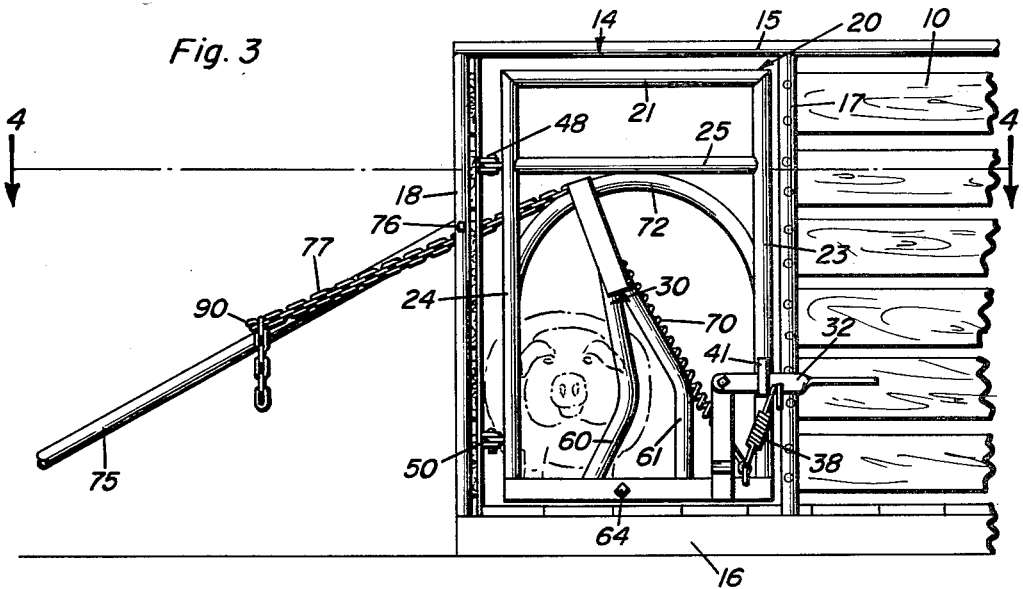
FIGURE 3 is a front elevational view of the device in FIGURE 1, showing it in use.
Figure 4:
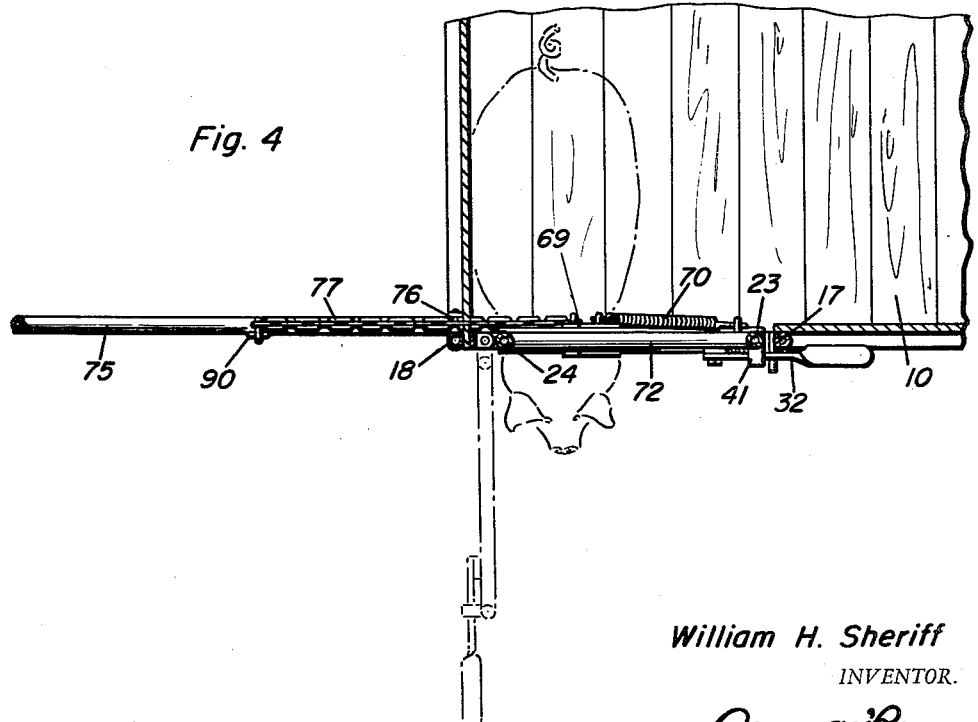
FIGURE 4 is a sectional view taken on the line 4—4 of FIGURE 3.

In the accompanying drawings there is an illustration of a pen 10 which merely diagrammatically represents one typical use of the restraining device 12. The restraining device has an outer frame 14 made of an upper frame member 15, a lower frame member 16 and side frame members 17 and 18, all joined to form a rectangular frame 14. At this point it is to be specifically noted that the frame 14 is shown as part of pen 10, but this is completely unessential in that the frame 14 may be made separate and installed as a part of a doorway, in an alley, pen or other convenient opening.

A framework door 20 is mounted in the rectangular opening defined by frame 14. The door 20 has an upper frame member 21, a lower frame member 22 of special construction, and side frame members 23 and 24 rigidly secured to the upper and lower frame members. The frame members 21, 23 and 24 may be made of tubular construction, for instance pipe or tubing, and they are braced by means of transverse brace 25 welded or otherwise secured to frame members 23 and 24 and arranged parallel to member 21. The lower frame member 22 is constructed of two flat plates 27 and 28 which are parallel to each other and which are each rigidly secured at their ends to members 23 and 24. The space between members 27 and 28 provides a passageway 29 to receive jaw 30 which constitutes an important part of the invention.

The door or gate 20 has a latch 32 which functions in the usual way and for the same purpose of any ordinary latch. Latch 32 is made of a lever 33 connected by a pivot 34 at its inner end to an upright 36 that is welded or otherwise secured to frame member 27. Spring 38 is secured at one end to lever 33 and at the other end to a spring support 40 attached to member 22. Lever restraining loop 41 is fixed to closure member 23 and has the lever 33 passed therethrough. As shown in FIGURE 1, the lever cooperates with a latch keeper 44 that is fixed to the side 17 of frame 14.

Inasmuch as it is preferred that gate 20 be capable of opening and closing to allow movement of the animals, hinges 48 and 50 are connected to member 24 and to the side 18 of frame 14.

Jaw 30 is of special construction and is shown in detail in FIGURE 5. It has an angulated side 60 which provides the clamping action on the animal, and another angulated side 61 adjacent thereto. The lower member 62 is secured to sides 60 and 61, and the general shape of the jaw 30 is triangular. A group of apertures 63 are in member 62 so that the movable jaw 30 may be connected by pivot 64 in a select position within passageway 29. This has the effect of adjusting the width of the opening to receive the animal (FIGURE 3). The upper juncture of members 60 and 61 defines a passageway by having a pair of plates 67 and 68 welded or otherwise secured to members 60 and 61 and formed as an extension thereof. An eye 69 is fixed to member 67 and has a spring 70 connected at one end thereto. The other end of the spring is connected to anchor 40 whereby spring 70 yieldingly opposes the pivotal movement of jaw 30 in one direction. The passageway 71 defined by plates 67 and 68 receives arcuate guide 72 which is in the form of a brace extending between members 23 and 24.

There are means for actuating the jaw 30, and these consist preferably of a lever 75 connected by pivot 76 at its inner end to frame member 18. A chain 77 is attached to lever 75 intermediate the ends thereof and extends through an opening 78 in the side of the pen 10. The inner extremity of the chain 77 is attached to an eye 82 which is fixed to the upper end of plate 67. The outer end of chain 77 is attached to the lever by a hook 90 to allow for chain length adjustment.

In use the animal will walk toward the gate 20 since it is of open framework construction. When the animal is properly positioned between member 24 and movable jaw 30, the lever 75 is forced down to carry the chain 77 past the pivot point 76. This pivotally moves the movable jaw 30 so that the member 60 of the movable jaw bears against the proper place of the animal and restrains the animal. The animal is held in this position, without force being exerted by the operator, by reason of the chain having passed the pivot point and the restriction of further movement of the lever by reason of being in contact with the ground or floor.

Thereafter, the movable jaw 30 is released allowing spring 70 to return it to the rest i.e. open position, and the gate 20 is opened allowing the animal to pass.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an animal restraining device which includes a frame, said frame having sides, an arcuate guide extending between said sides, said frame also including upper and lower frame members, an essentially triangular movable jaw pivoted at its base to the lower frame member and cooperating with one of said sides to engage an animal, said arcuate guide being substantially concentric about the pivot connection between the jaw base and frame member, means connected with said movable jaw and engaging said guide to constrain the movement of said movable jaw, a lever, means connected between said lever and said movable jaw to pivotally operate said movable jaw, resilient means connected between said movable jaw and said frame to yieldingly oppose the pivotal movement of said movable jaw in one direction and to return said movable jaw to a rest position, said base having a plurality of spaced holes therein selectively alignable with an aperture in said lower frame, a removable pivot member extending through said aperture and one of said holes.

2. The subject matter of claim 1 wherein said frame constitutes a gate, an outer frame adapted to be positioned in an opening, a hinge means connected with said outer frame and the first mentioned frame thereby hingedly mounting said gate.

3. The subject matter of claim 2 wherein there is a latch connected between said frame and said gate.

4. A device as defined in claim 1 wherein said means between the lever and jaw comprises a chain, adjusting means connecting one end of said chain to said lever, said adjusting means including a hook on the lever selectively engageable with one of the links comprising the chain.

5. A device as defined in claim 1 wherein said lever is movable to an over-center position with respect to the means connecting the lever and jaw and is engageable with the surface upon which the restraining device is mounted for holding it in overcenter position.

6. In an animal restraining device which includes a frame, said frame having sides, an arcuate guide extending between said sides, said frame also including upper and lower frame members, an essentially triangular movable jaw pivoted at its base to the lower frame member and cooperating with one of said sides to engage an animal, said arcuate guide being substantially concentric about the pivot connection between the jaw base and frame member, means connected with said movable jaw and engaging said guide to constrain the movement of said movable jaw, a lever, means connected between said lever and said movable jaw to pivotally operate said movable jaw, resilient means connected between said movable jaw and said frame to yieldingly oppose the pivotal movement of said movable jaw in one direction and to return said movable jaw to a rest position, said means pivotally connecting said jaw to said lower frame member including a group of apertures and a bolt connected with said movable jaw and said lower frame member so that said bolt may be selectively positioned in said apertures to vary the effective spacing between one of said frame members and said movable jaw.

7. A device as defined in claim 6 wherein said jaw is formed with a concave surface facing said one side.

References Cited in the file of this patent

UNITED STATES PATENTS

| | | |
|---|---|---|
| 1,517,573 | Momyer | Dec. 2, 1924 |
| 1,799,073 | Thompson | Mar. 31, 1931 |
| 2,733,685 | LaRue | Feb. 7, 1956 |